(12) United States Patent
Tuineag

(10) Patent No.: US 10,794,511 B2
(45) Date of Patent: Oct. 6, 2020

(54) PRESSURE INDEPENDENT CONTROL VALVE WITH AN ELECTRONIC CONTROL SYSTEM

(71) Applicant: Griswold Controls, LLC, Irvine, CA (US)

(72) Inventor: Stefan I. Tuineag, Irvine, CA (US)

(73) Assignee: Griswold Controls, LLC, Irvine, CA (US)

(*) Notice: Subject to any disclaimer, the term of this patent is extended or adjusted under 35 U.S.C. 154(b) by 0 days.

(21) Appl. No.: 16/445,026

(22) Filed: Jun. 18, 2019

(65) Prior Publication Data

US 2019/0301631 A1 Oct. 3, 2019

Related U.S. Application Data

(63) Continuation of application No. 15/617,264, filed on Jun. 8, 2017, now Pat. No. 10,323,768.

(51) Int. Cl.
| | |
|---|---|
| *F16K 31/126* | (2006.01) |
| *F28F 27/00* | (2006.01) |
| *F16K 31/128* | (2006.01) |
| *F16K 37/00* | (2006.01) |
| *G05D 16/00* | (2006.01) |
| *G05D 16/20* | (2006.01) |
| *G05D 1/00* | (2006.01) |
| *F25B 41/04* | (2006.01) |

(52) U.S. Cl.
CPC .......... *F16K 31/126* (2013.01); *F16K 31/128* (2013.01); *F16K 37/005* (2013.01); *F28F 27/00* (2013.01); *G05D 1/00* (2013.01); *G05D 16/028* (2019.01); *G05D 16/2095* (2019.01); *F25B 41/04* (2013.01)

(58) Field of Classification Search
CPC ...... F16K 1/126; F16K 31/128; F16K 37/005; G05D 16/028; G05D 16/2095; G05D 1/00; F28F 27/00; F25B 41/04
USPC ................ 137/487.5, 625.6, 596.14, 596.16; 251/331, 335.2
See application file for complete search history.

(56) References Cited

U.S. PATENT DOCUMENTS 2,566,019 A * 8/1951 Dempsey ............. G05D 23/275
236/84
3,282,556 A * 11/1966 Hancock ............... F16K 31/402
251/122

(Continued)

*Primary Examiner* — Minh Q Le
(74) *Attorney, Agent, or Firm* — Crockett & Crockett, PC; K. David Crockett, Esq.

(57) ABSTRACT

A flow control valve including a main valve and a pilot valve for controlling a piston of the main valve. The valve maybe controlled through a control system based o^pn measured pressures or temperatures in a system supplied or controlled by the valve. The valve may be operated as a pressure independent control valve, using pressure measurement from a supply line and exit line or return line of a hydronic HVAC system as inputs to the control system, which is operable to maintain a constant pressure drop across the system, or the valve may be operated as a temperature independent control valve, using temperature measurements from a supply line and exit line or return line of a hydronic HVAC system as inputs to the control system which is operable to maintain a constant temperature drop across the system.

18 Claims, 5 Drawing Sheets

(56) References Cited

U.S. PATENT DOCUMENTS

| | | | | |
|---|---|---|---|---|
| 3,698,412 A * | 10/1972 | Smyly | | F15B 5/00 137/81.1 |
| 4,181,245 A * | 1/1980 | Garrett | | A61M 5/16809 222/450 |
| 4,749,003 A * | 6/1988 | Leason | | F16K 15/148 137/854 |
| 4,889,158 A * | 12/1989 | Rice | | G05D 16/0688 137/484.4 |
| 4,967,996 A * | 11/1990 | Sonoda | | F16K 31/402 251/129.15 |
| 5,467,960 A * | 11/1995 | Morris | | B60H 1/00485 251/30.01 |
| 6,079,449 A * | 6/2000 | Gerber | | B65D 47/2081 137/512.3 |
| 6,126,140 A * | 10/2000 | Johnson | | F15C 5/00 251/129.01 |
| 6,296,227 B1 * | 10/2001 | Burcham | | F16K 31/402 251/30.03 |
| 6,557,820 B2 * | 5/2003 | Wetzel | | F15C 5/00 137/596.16 |
| 7,201,187 B2 * | 4/2007 | Irwin | | F16K 7/17 137/625.28 |
| 8,281,810 B2 * | 10/2012 | Feenstra | | F16K 31/128 137/220 |
| 2004/0103677 A1 * | 6/2004 | Hirota | | F25B 41/043 62/197 |
| 2007/0252103 A1 * | 11/2007 | Wu | | F16K 7/17 251/335.2 |
| 2013/0150779 A1 * | 6/2013 | Field | | A61F 9/00781 604/9 |
| 2014/0117262 A1 * | 5/2014 | Deperraz | | F16K 31/02 251/11 |
| 2017/0198825 A1 * | 7/2017 | Tuineag | | F16K 17/04 |
| 2017/0227134 A1 * | 8/2017 | Tuineag | | G05D 7/03 |

\* cited by examiner

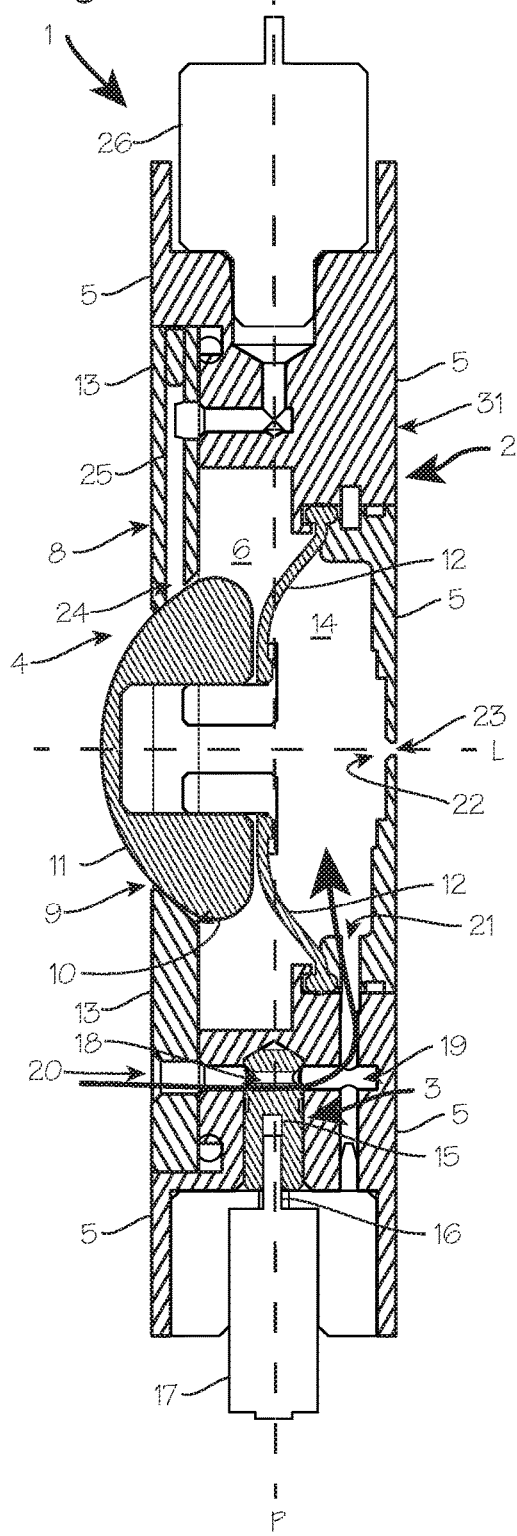
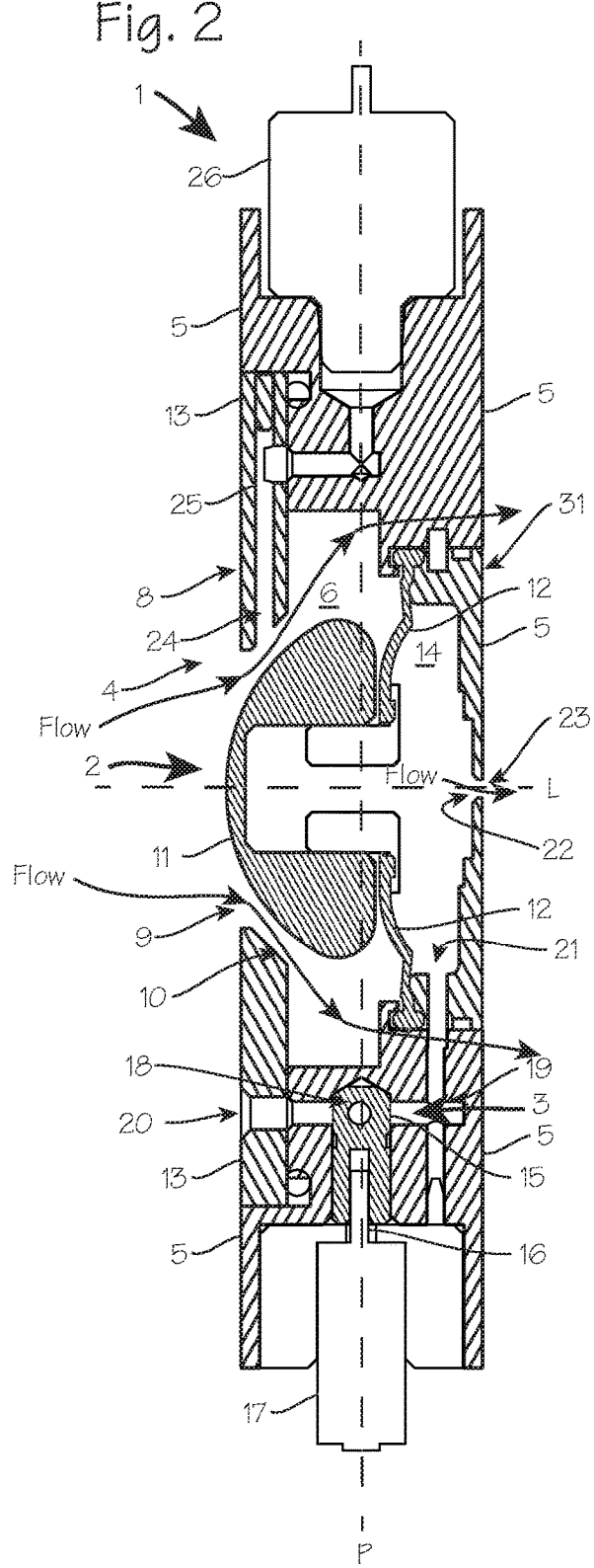
Fig. 1
Fig. 2

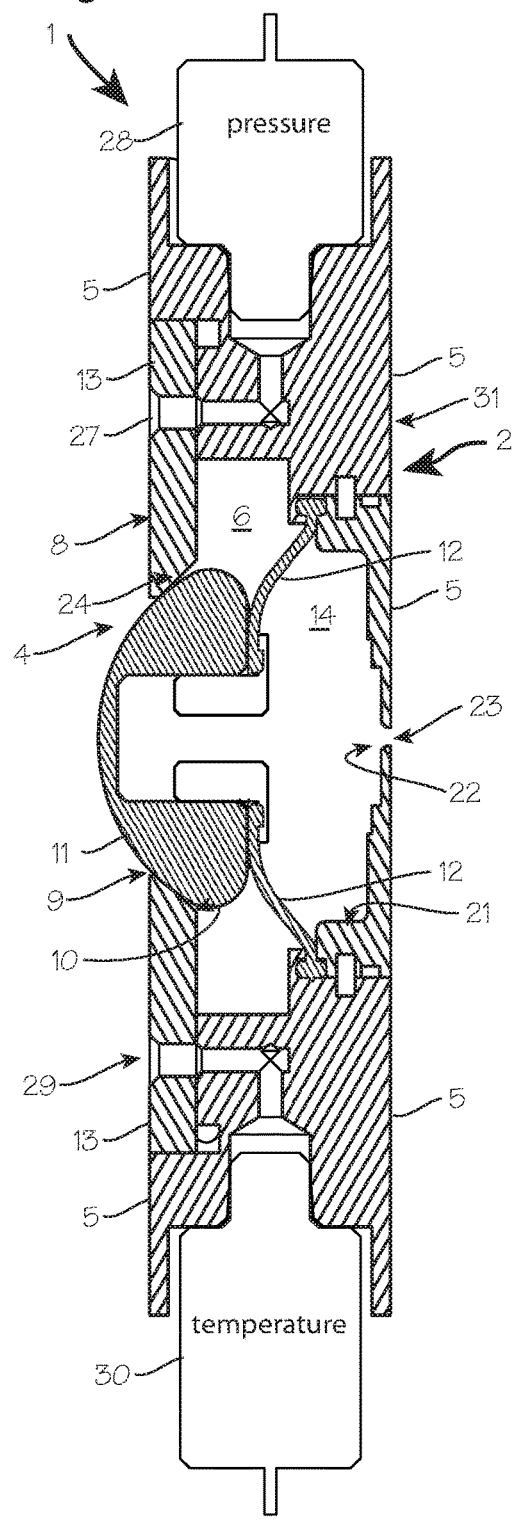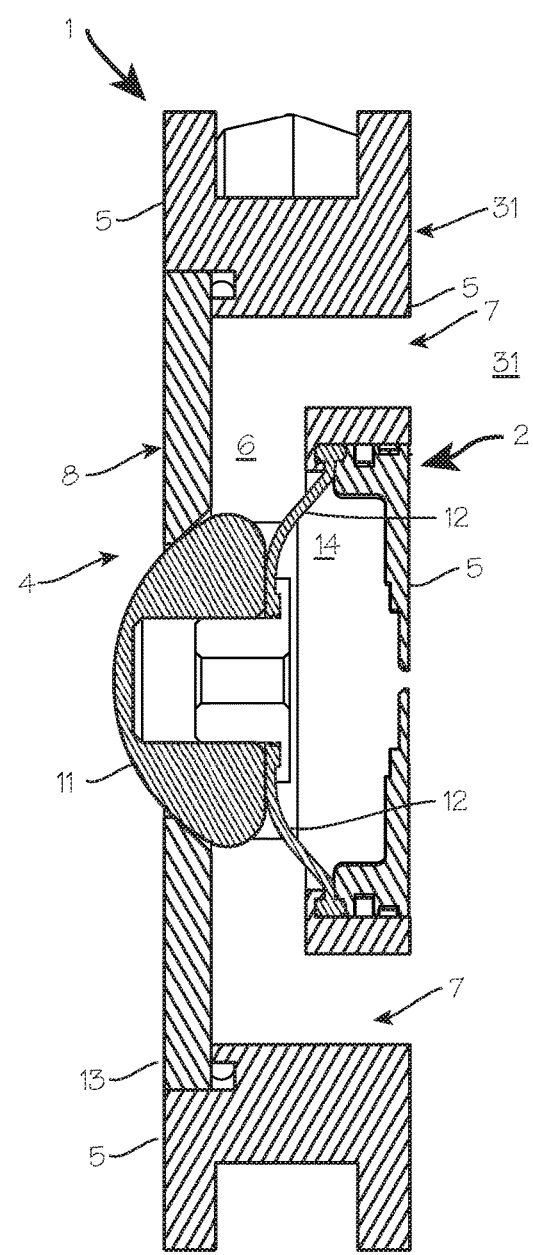

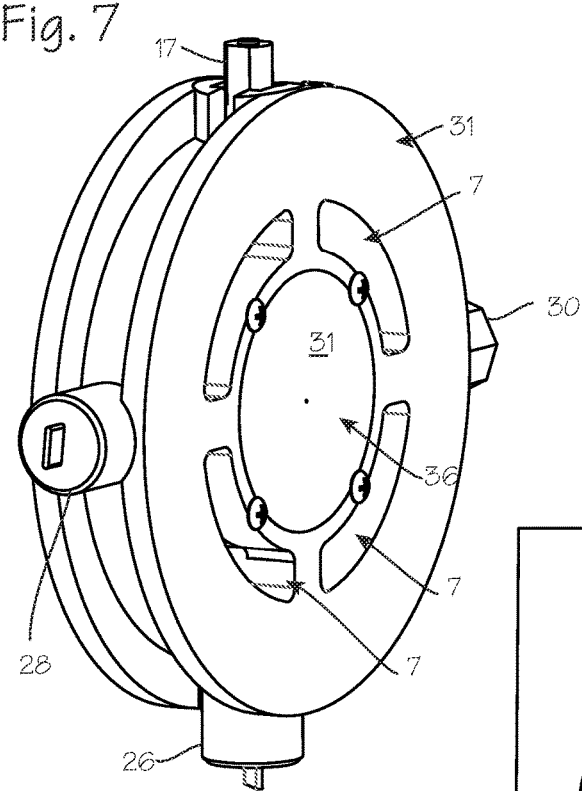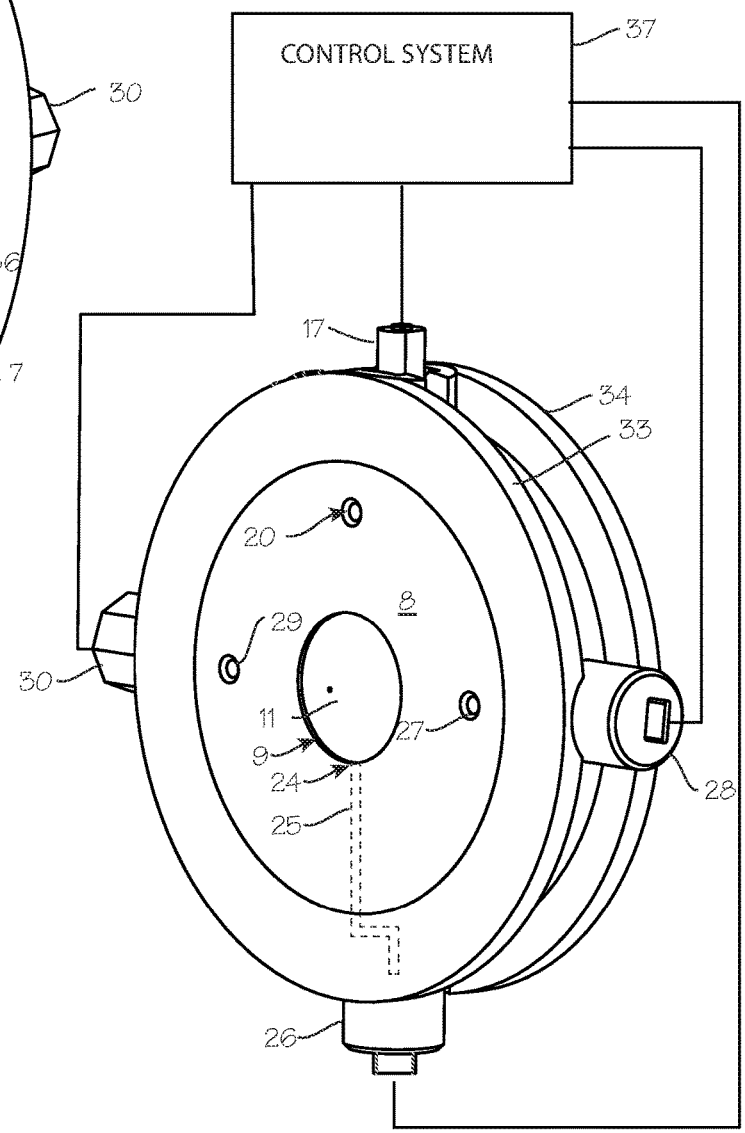

supply return

the output …

PRESSURE INDEPENDENT CONTROL VALVE WITH AN ELECTRONIC CONTROL SYSTEM

This application is a continuation of U.S. application Ser. No. 15/617,264, filed Jun. 8, 2017, now U.S. Pat. No. 10,323,768

FIELD OF THE INVENTIONS

The inventions described below relate the field of pressure independent control valves.

BACKGROUND OF THE INVENTIONS

Current pressure independent control valves used in HVAC systems are installed in high flow applications and operate to maintain a constant pressure differential across a piping system despite fluctuations in the pressure of the fluid supply. These valves use typical valve discs and valve seats, and the valve disk position is altered by fluid pressure of fluid flowing through the valve and acting on a membrane fixed to a valve stem.

SUMMARY

The devices described below provide for control of flow through a piping system with a valve operable as a pressure independent control valve or a temperature independent control valve. The control valve includes a main valve using a bulbous closing element operable to translate within the valve, to seat against a seating element. The bulbous closing element floats on a diaphragm which forces the bulbous closing element against the seat when pressure is applied to the diaphragm, on the side of the diaphragm opposite the bulbous closing element and the seat. The control valve also includes a pilot valve for controlling the bulbous closing element of the main valve. The main valve is controlled in part with high pressure fluid ported through pilot valve, from a high-pressure port in the upstream face of the valve, or an associated piping system. The pilot valve is controlled by a computer system in response to the pressure differential across the valve, or across an associated piping system (in which case it may be operate as a pressure independent module, or PIM, as that term is used in the art) or in response to a temperature differential sensed across an associated piping system (in which case it may be operated as a temperature independent module, or TIM, as that term is used in the art). The pilot valve is operable to port high pressure fluid in the system to a chamber behind the diaphragm to force the diaphragm and bulbous closing element toward the seat, or isolate the chamber from high pressure (allowing the fluid in the chamber to bleed off and thus allowing the diaphragm to revert to an unpressurized configuration, thus drawing the diaphragm and the bulbous closing element away from the seat. In this manner, the main valve is operable to throttle flow through the valve, in response to pressure or temperature differentials sensed by the control system.

BRIEF DESCRIPTION OF THE DRAWINGS

FIGS. 1 and 2 are a cross sections of the flow control valve, showing the control fluid source and a low-pressure input.

FIG. 3 is a cross section of the flow control valve, showing the control fluid source, a high-pressure input and a high temperature input.

FIG. 4 is a cross section of the flow control valve taken along a different radial cross section, showing the several outlet apertures.

FIGS. 6 and 7 illustrate the inlet and outlet sides of the valve.

DETAILED DESCRIPTION OF THE INVENTIONS

Figure 5:
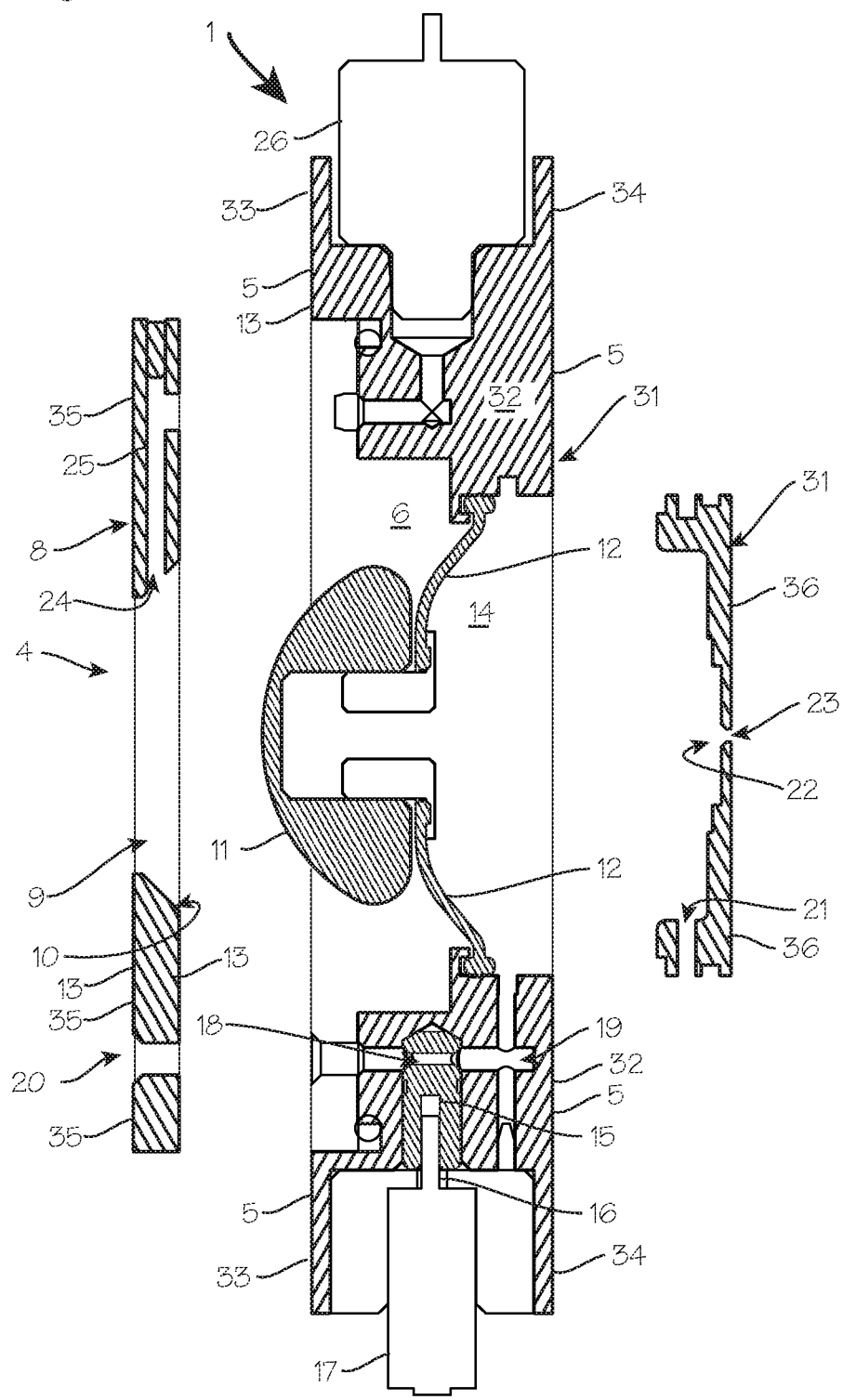
FIG. 5 is an exploded view of the valve, in a cross section corresponding to FIG. 1.

FIGS. 1 and 2 illustrate a cross section of the flow control valve 1. The flow control valve is an assembly composed of a main valve 2 and a pilot valve 3. The main valve portion includes a main valve inlet 4, which is formed in the valve body 5 with a bore 6, and an outlet 7 (see FIG. 4), all making up the valve. The inlet side of the valve (item 8) comprises an inlet aperture 9, with a beveled opening into the bore to provide a seating element in the form of valve seat 10. The valve seat comprises the inner wall circumscribing the aperture, which is sized to match the shape of the closing element 11, which is a valve disc or plunger with a generally hemispherical or bulbous exterior contour (facing the valve seat). As illustrated, the closing element is a hemispherical closing element.

The bulbous valve disc 11 and a diaphragm 12 of main valve 2 are disposed within the bore 6 of the valve body, in opposition to the valve seat 10 formed in the wall of the inlet side (item 13 of the valve body). The diaphragm is operable, through operation of the pilot valve and subsequent pressurization of the main valve operating chamber 14, to resiliently flex longitudinally within the bore 6 of valve body, toward the main valve inlet 4 upon pressurization main valve operating chamber, to translate the bulbous valve disc 11 toward the valve seat 10 and the inlet aperture to occlude (partially or fully) the inlet aperture to control the rate of flow through the main valve, and, upon depressurization of the diaphragm, to return to a less distended, flatter configuration and pull the bulbous valve disc away from the main valve inlet to open, or occlude less of the inlet aperture. The diaphragm may be resiliently biased to the more rounded configuration corresponding to the closed configuration of the valve, or vice versa. The diaphragm may comprise silicon rubber, EPDM rubber (preferably peroxide-cured), or the like, preferably reinforced with fiber. The closing element may comprise a hard, non-conforming material (metal or plastic) or a resilient material. The inlet aperture 9, seating element 10, closing element 11, bore 6, diaphragm 12, and operating chamber 14 are preferably aligned along a common longitudinal axis L, generally perpendicular to the plane P established by the disk, passing through the valve. The outlet apertures 7 may also be arranged symmetrically about this axis. As shown in the Figures, the common longitudinal axis L is preferably centered in the flow path, so that each component is centered in the bore 6 of the valve. Conveniently, the bore of the valve is centered in the valve, though it may be off-center. The bore defines a radial portion of the disk, preferably a central radial portion of the disk, and the remainder of the disk defines an outer radial portion of the disk. The disk is further characterized by a side wall circumscribing the disk.

The pilot valve 3 includes a closing element such as cylinder 15 fixed to a pilot valve drive shaft 16. The pilot valve may be a fast-acting plug valve, a ball valve, a needle valve, or other suitable valve. The valve depicted in FIG. 1 is a cylindrical plug valve, similar to a ball valve, but using a cylinder with a flow channel in lieu of a ball, and uses a motor 17 to rotate the cylinder, to bring the bore 18 of the cylinder into and out of alignment with the bore 19 of the pilot valve portion of the valve. The pilot valve and its bore are configured to provide a fluid channel for pressurized fluid from the pilot valve inlet port 20 on the inlet face of the valve body, through the bore of the cylinder, to the pilot valve outlet port 21 and into the main valve operating chamber 14. The pilot valve is operated in an on/off mode. Other pilot valves, such as needle valves, may be used, and these may be operated as shut-off valves or throttle valves.

The main valve operating chamber 14 is configured to receive pressured fluid from the pilot valve 3 through the pilot valve output port 21, and bleed pressurized fluid from the main valve operating chamber 14 through the relief port 22 and the very short relief line 23.

FIG. 1 shows the control valve in a closed configuration, while FIG. 2 shows the valve in an open configuration. In the configuration shown in FIG. 1, the pilot valve 3 is open, porting high pressure fluid from the inlet side of the valve through the pilot valve inlet port 20 on the inlet side of the valve, and through the pilot valve bore 19, through the pilot valve outlet port 21 and into the main valve operating chamber 14. With the main valve operating chamber pressurized with fluid from the inlet side of the valve, over the entire area of the diaphragm 12, the diaphragm and bulbous valve disc 11 are forced toward the inlet aperture and the valve seat (despite the high pressure applied to the inlet-facing surface of the bulbous valve disc) to close the valve, partially or completely. In the configuration shown in FIG. 2, the pilot valve 3 is shut, blocking high pressure fluid from the inlet side reaching the main valve operating chamber 14, such that the fluid in the main valve operating chamber bleeds off into the outlet side of the valve through the relief port 22 and relief line 23 leading out of the chamber. With the main valve operating chamber de-pressurized, the diaphragm 12 and bulbous valve disc 11 are forced (by the pressure of inlet fluid on the inlet side of the valve) away from the inlet aperture and the valve seat (depending on the remaining pressure behind the diaphragm) to open the valve, partially or completely. (The control of the pilot valve is explained below.)

FIGS. 1 and 2 also show a low-pressure sensing port 24 in the wall of the inlet side of the valve, on the inner wall of the inlet aperture (the seating face of the valve seat). This sensing port communicates through low-pressure sensing line 25 to a pressure sensor 26.

FIG. 3 is a cross section of the flow control valve, along a different radial cross section showing an inlet pressure input port and an inlet temperature input port. This view shows the valve 1 with its main valve 2 comprising the valve body 5, the inlet aperture 9 on the inlet side of the valve (item 8), the bulbous valve disc 11, diaphragm 12 and main valve operating chamber 14 and other components. The pilot valve is not visible in this cross section. For use in the pressure independent module (PIM) mode, a first sensing port 27 on the inlet face of the valve, exposed to inlet fluid pressure, communicates with a pressure sensor 28. For use in the optional temperature independent module (TIM) mode, second sensing port 29 on the inlet face of the valve, exposed to inlet fluid at inlet temperature, communicates with a temperature sensor 30. These sensors are operable to provide signals corresponding to valve inlet pressure or temperature to a control system, which in turn controls operation of the pilot valve, based on those signals, to control the main valve, as describe below. The various sensing ports are preferably open to the inlet side of the valve, though they may be disposed within the disk such that they are open to the outlet side of the valve, in system configuration in which the sensed temperature or pressure on the outlet side of the valve are useful by the control system to control flow through the valve. The temperature and pressure sensors are conveniently disposed within a peripheral region of the valve, within radially inwardly extending bores, extending inwardly from the side wall of the disk, to communicate with the corresponding sensing ports.

FIG. 4 is a cross section of the flow control valve, along a different radial cross section showing the outlet apertures 7 on the outlet side of the valve (item 31). This view also shows the valve 1 with its main valve 2 comprising the valve body 5, the inlet aperture 9 on the inlet side of the valve (item 8), the bulbous valve disc 11, diaphragm 12 and main valve operating chamber 14 and other components. The pilot valve and the various inputs and sensors are not visible in this cross section. The outlet apertures 7 are radially displaced from the center of the valve outlet side, and are formed in the outlet side of the valve so as to leave radially extending spokes supporting the radially central supporting structure for the diaphragm and bulbous valve disc.

FIG. 5 is an exploded view of the valve, in a cross section corresponding to FIG. 1. The valve body 5 includes a cylindrical main body 32 with flanges 33 (on the inlet side) and 34 (on the outlet side) of the cylinder for connection to the associated piping system. The bore of the cylinder corresponds to the bore of the valve. A portion of the wall 13 of the inlet side of the valve is provided in the form of a plate 35, and the inlet aperture 9 is formed as a bevel-edged hole in the plate, in which the bevel widens from the inlet side of the plate to the inside surface of the plate to form the valve seat 10 configured to mate with the contour of the valve disc 11. The low-pressure sensing port 24 and low-pressure sensing line 25, are located in the inlet plate 35, and the low-pressure sensor 26 protrudes into the main valve body from the periphery of the main valve body to communicate with the low-pressure sensing line. The sensor is operable to provide signals corresponding to the pressure of fluid in the aperture, flowing past the port, to a control system, which in turn may be operable to control operation of the pilot valve, based on those signals (in combination with other signals), to control the main valve, as describe below. The inlet pressure sensor and temperature sensor (not visible in this view) also protrude into the main valve body from the periphery of the main valve body to communicate with the corresponding sensing lines. The sensors are operable to provide signals corresponding to the pressure of fluid or temperature in the aperture or at the inlet, flowing past the corresponding ports, to a control system, which in turn controls operation of the pilot valve, based on those signals (in combination with other signals), to control the main valve, as describe below.

The bevel of the inlet aperture may be shaped such that the inlet aperture forms a Venturi or orifice plate with which the flow rate through the valve may be measured, using input from the inlet pressure sensor 28 sensing inlet pressure through inlet pressure sensing port 27 (both shown in FIG. 3) as high pressure input and input from the pressure sensor 26 sensing inlet pressure through pressure sensing port 24 as low pressure input for calculation of flow rates through the valve.

Though the body of control valve may be made in any convenient manner, the body as illustrated is constructed of several pieces which facilitate installation of the diaphragm and bulbous valve disc, the valve seat, the operating chamber, and the pilot valve and sensors. The main body may comprise a cylinder or generally cylindrical structure, and the inlet plate may comprise a discrete plate inset into a rabbet on the inner circumference of the cylinder on the inlet side of the cylinder. The diaphragm may be set into a second portion of the cylinder, in a rabbet on the inner circumference of the cylinder on the outlet side of the cylinder, and this portion of the cylinder may be capped with a plate 36 to form the main valve operating chamber. (Plate 35 or 36 may be formed integrally with the cylindrical main body 32, or the valve may be constructed using various combinations of subcomponents.). The various ports and channels may be machined into the cylinder. A bore for the pilot valve closing element (the cylinder 15) and a bore for the motor are radially oriented with respect to the disk, and extend inwardly from the side wall of the valve.

FIGS. 6 and 7 illustrate the inlet and outlet sides of the valve. FIG. 6 is a perspective view of the inlet side of the valve (8), showing the inlet aperture 9 and the bulbous valve disc 11. This view also shows the first sensing port 27 (for inlet pressure sensing) and the temperature sensing port 29. The low-pressure sensing port 24 and low-pressure sensing channel 25 are shown in phantom. The high-pressure sensor 28, the low-pressure sensor 26 and temperature sensor 30 are shown, disposed within the valve body, between the inlet side flange 33 and outlet side flange 34. The control system 37 is operably connected to the various inputs, for receiving signals corresponding to the pressure or temperature at the sensors, and is also operably connected to the motor 17, for operating the pilot valve in response to the sensed pressures or temperatures. The control system may be disposed between the flanges of the valve, without protruding beyond the circumference of the flanges, or it may be remotely located.

FIG. 7 is a perspective view of the outlet side of the valve (31). This view shows the outlet apertures 7 in the outlet side and the outer surface of the struts of FIGS. 1, 2, and 3 which join the operating chamber to the main cylinder of the valve body. This view also shows the operating chamber plate 36. (The cross section of FIGS. 1 and 2 corresponds to a radial axis passing through the pilot valve cylinder 15 and pilot valve motor 17 and the low-pressure sensor 26, while the cross section of FIG. 3 corresponds to the radial axis passing through the pressure sensor 28 and temperature sensor 30, and the cross section of FIG. 4 corresponds to a radial axis passing through the outlet apertures 7.)

The valve can be used as a PIM, using the pilot valve to control flow through the valve to maintain a constant pressure drop across the valve itself, or to maintain a constant pressure drop across an associated piping system. A control system is shown schematically in FIG. 6. This control system is programmed to accept signals from the low-pressure sensor 26 and high-pressure sensor 28, corresponding to the pressure sensed by each sensor, and determine the pressure differential between the associated sensing ports 24 and 27, and compare the determined pressure differential to a predetermined pressure differential, and then, conditionally, cause energization of the pilot valve motor to open or close (or throttle) the pilot valve as necessary to close or open the main valve to maintain a sensed pressure differential which matches the predetermined pressure differential (within an acceptable band close to the predetermined pressure differential). The predetermined pressure differential may be preset when the system is manufactured, or entered into the control system by an installer or user.

To maintain a constant pressure drop across the valve itself, the control system and sensors built into the valve may be used. To maintain a constant pressure drop across an associated piping system, pressure sensors disposed in the associated system can be used, and may include a high-pressure sensor at the input of the associated piping system and a low-pressure sensor at the output of the associated piping system. If the valve is installed downstream of the associated piping system, the sensor 28 used to sense high pressure when the valve is used in isolation may be used as the low-pressure sensor of the associated piping system. If the valve is installed upstream of the associated piping system, the sensor 28 used to sense high pressure when the valve is used in isolation may be used as the high-pressure sensor of the associated piping system, and a low-pressure sensor at the outlet of the associated piping system may be used by the control system as the low-pressure sensor.

The valve can be used as a temperature independent control valve or temperature independent module (TIM), using the pilot valve to control flow through the valve to maintain a constant temperature drop across an associated piping system. To operate as a temperature independent control valve or temperature independent module (TIM), the control system shown in FIG. 6 is programmed to accept signals from the temperature sensor 30 and a temperature sensor in the associated piping system, corresponding to the temperature sensed by each sensor, and determine the temperature differential between the associated temperature sensor, and compare the determined temperature differential to a predetermined temperature differential, and then, conditionally, cause energization of the pilot valve motor to open or close (or throttle) the pilot valve as necessary to close or open the main valve to maintain a sensed temperature differential which matches the predetermined temperature differential (within an acceptable band close to the predetermined temperature differential). The predetermined temperature differential may be preset when the system is manufactured, or entered into the control system by an installer or user.

Figure 8:
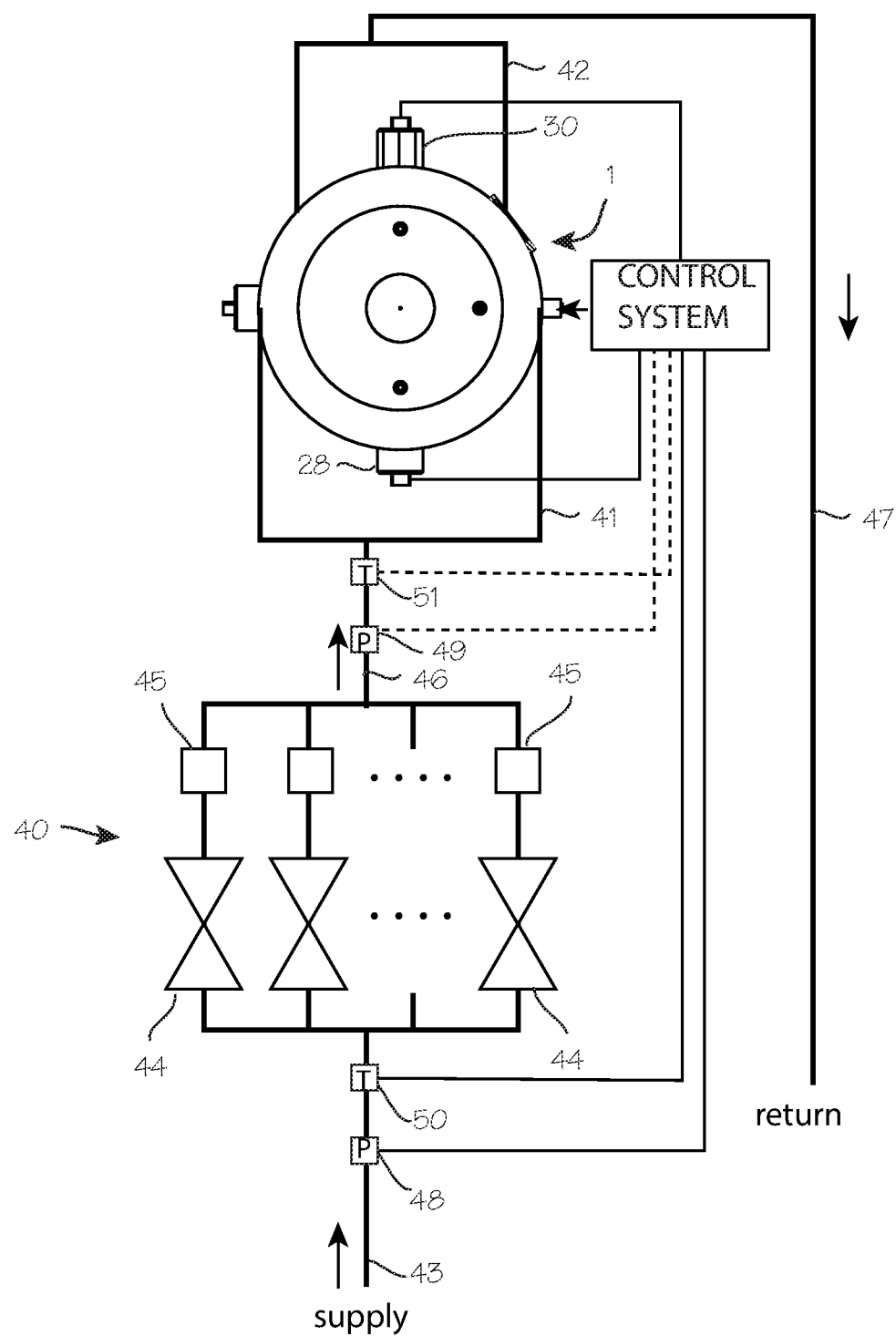
FIG. 8 is a schematic of a piping system, such as an HVAC system, in which the valve of FIG. 1 may be used.

FIG. 8 illustrates an overall piping system, with the valve 1 controlling flow through an associated piping system 40, such as an HVAC system, in which the valve of FIG. 1 may be used. The valve is installed in a piping system, with an upstream inlet pipe 41 and a downstream outlet pipe 42, establishing respective upstream and downstream sides of the flow control valve. The system may include a supply line 43, any number of branch valves 44 in various branches used to adjust flow to various loads 45, and an outlet line 46 (which is an initial portion of the return line). The control valve 1 is installed in the return line, comprising outlet line 46, the upstream and downstream pipes 41 and 42, and the remainder of the return line (item 47). In an HVAC system, the branch valves may be inexpensive pressure independent control valves (such as Griswold PIC-V®, MVP® and PIM valves), manually operated ball valves or throttle valves, or other valves, and the loads might be individual heat exchangers or rooms to be supplied with fluid through a main supply pipe, a manifold or a bank of branch valves. When used as a PIM to control flow through an associated piping system, the high pressure input is taken from a pressure sensor 48 on the supply line 43, and the low pressure input may be taken from the pressure sensor 28 which is disposed in the valve (which serves as the high-pressure sensor when the valve is used to control the pressure drop across the valve itself) or from a pressure sensor 49 disposed in the return line of the associated piping system.

When used as a temperature independent control valve or temperature independent module (TIM) to control flow through an associated piping system (an HVAC cooling system, in this case), the inlet temperature input is taken from a temperature sensor 50 on the supply line 43, and the outlet temperature input may be taken from the temperature sensor 30 which is disposed in the valve or from a temperature sensor 51 disposed on the outlet of the associated piping system. (When used for cooling, the temperature sensor 50 will be used as a high temperature sensor, and the temperature sensor 51 will be used as a low temperature sensor.) The valve may be operated in another mode, in which the valve is throttled as necessary to maintain temperature at the outlet of the associated piping system, without regard to the temperature differential across the system.

When used to control flow across a piping system, the control system is operable to control the pilot valve, and the control system is operable to receive signals from first and second sensors pertaining to fluid in a system controlled by the valve, and control the pilot valve to in turn control the main valve, to in turn control flow through the valve in response to the signals from the first and second sensors. The respective sensors may be disposed proximate the outlet of the piping system (the return line) and the inlet of the piping system (the supply line), with the loads between the inlet and outlet. Sensors within the valve may be used as either input sensors or output sensors, depending on the position of the valve within the piping system.

Several inventive aspects of the pressure independent control valve have been described. The benefits of each of the various inventions may be obtained in combination with the other inventions, or in isolation without the other inventions. For example, the benefits of the configuration of the bulbous disc and diaphragm which provides for a very short and lightweight valve may be achieved with or without the benefits of compact construction arising from disposing the sensors in the cylinder of the valve body, and both may be obtained with or without the benefits of using the control system, rather than system pressures, to control the pilot valve. The temperature sensing components may be omitted for embodiments intended for use as a PIM, and, conversely, the pressure sensing components may be omitted in embodiments intended for use as a TIM. The components useful for flow measurement may be omitted in embodiments intended for use as a PIM and/or a TIM.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A flow control valve comprising:
   a main valve having an inlet and an outlet, said main valve comprising:
   a disk having an inlet side and an outlet side, and characterized by a longitudinal axis passing through the inlet side and the outlet side, said disk having an inlet aperture on the inlet side, and an outlet aperture on the outlet side, and a bore extending from the inlet aperture to the outlet aperture;
   a closing element disposed in opposition to the inlet aperture and translatable into and out of occlusive relationship with the inlet aperture, with said inlet aperture serving as a seating element for the closing element; and
   an operating chamber disposed within the bore, with a diaphragm comprising a first portion of the operating chamber and supporting the closing element, said diaphragm being extensible toward the inlet aperture; and
   a pilot valve disposed within the disk, with a high-pressure inlet open to the inlet side of disk, said high pressure inlet in fluid communication, through the pilot valve, with the operating chamber, said pilot valve being operable to control flow of fluid from the inlet side of the disk to the operating chamber;
   wherein the disk further comprises a cylindrical main body defining the bore, a first plate disposed over the inlet side of the valve, a second plate proximate the outlet aperture and comprising a second portion of the operating chamber.

2. The valve of claim 1, wherein the inlet aperture, closing element, diaphragm and operating chamber are aligned along the longitudinal axis of the disk.

3. The valve of claim 2, wherein the longitudinal axis is a central longitudinal axis of the bore.

4. The valve of claim 1 wherein the bore defines a central radial portion of the disk, and the remainder of the disk defines an outer radial portion of the disk, and the disk is further characterized by a side wall circumscribing the disk, and the valve further comprises:
   a sensor disposed in the outer radial portion, and
   a port disposed on the valve, exposed to fluid flow and in fluid communication with the sensor.

5. The valve of claim 1 wherein the inlet aperture comprises an opening in the inlet side of the valve characterized by an inner wall circumscribing the aperture, and said valve further comprises:
   a first pressure sensor and a second pressure sensor,
   a first pressure sensing port disposed in the inlet aperture inner wall and in fluid communication with the first pressure sensor,
   a second pressure sensing port disposed on the inlet side of the disk and in fluid communication with the second pressure sensor;
   whereby the pressure sensed by the first and second pressure sensors may be used to measure flow through the valve.

6. The valve of claim 1, wherein the closing element is a bulbous disk sized and dimensioned to occlude the inlet aperture.

7. The valve of claim 1, further comprising:
   a first pressure sensing port opening into the inlet aperture, and a first sensing line running through the main valve body on the inlet side of the disk to a first pressure sensor; and
   a second pressure sensing port opening into the inlet side of the valve, and a second sensing line running through the main valve body to a second pressure sensor.

8. The valve of claim 7, wherein the first pressure sensor is disposed within a peripheral region of the valve, in a radially oriented bore running parallel to a plane defined by the disk and the second pressure sensor is disposed within a peripheral region of the valve, in a radially oriented bore running parallel to a plane defined by the disk.

9. The valve of claim 5, further comprising:
a first temperature sensor disposed within a peripheral region of the valve, and a temperature sensor port communicating from the inlet or outlet side of the valve to the temperature sensor.

10. A valve and control system assembly comprising:
the flow control valve of claim 1 and
a first sensor and a second sensor,
a control system operable to control the pilot valve, said control system operable to receive signals from the first and second sensors pertaining to fluid in a system controlled by the valve, and control the pilot valve to in turn control the main valve, to in turn control flow through the valve in response to the signals from the first and second sensors.

11. A valve and control system assembly comprising:
the flow control valve of claim 2, and a first sensor and a second sensor,
a control system operable to control the pilot valve, said control system operable to receive signals from the first and second sensors pertaining to fluid in a system controlled by the valve, and control the pilot valve to in turn control the main valve, to in turn control flow through the valve in response to the signals from the first and second sensors.

12. A valve and control system assembly comprising:
the flow control valve of claim 3, and a first sensor and a second sensor,
a control system operable to control the pilot valve, said control system operable to receive signals from the first and second sensors pertaining to fluid in a system controlled by the valve, and control the pilot valve to in turn control the main valve, to in turn control flow through the valve in response to the signals from the first and second sensors.

13. An HVAC system and flow control valve comprising:
the flow control valve of claim 1;
a first sensor and a second sensor;
a control system operable to control the pilot valve, said control system operable to receive signals from the first and second sensors pertaining to fluid in a system controlled by the valve, and control the pilot valve to in turn control the main valve, to in turn control flow through the valve in response to the signals from the first and second sensors;
a piping system comprising a supply line, a return line, and at least one load between the supply line and the return line;
wherein:
the first sensor is a pressure sensor in fluid communication the supply line;
the second sensor is a pressure sensor in the return line;
the valve is disposed in the piping system, in the supply line or return line;
the control system is programmed to control flow through the valve to maintain a predetermined pressure differential between the first and second sensor.

14. The HVAC system and flow control valve of claim 13, wherein the inlet aperture, closing element, diaphragm and operating chamber of the valve are aligned along the longitudinal axis of the disk.

15. The HVAC system and flow control valve of claim 14, wherein the longitudinal axis of the disk is a central longitudinal axis of the bore.

16. An HVAC system and flow control valve comprising:
the flow control valve of claim 1;
a first sensor and a second sensor;
a control system operable to control the pilot valve, said control system operable to receive signals from the first and second sensors pertaining to fluid in a system controlled by the valve, and control the pilot valve to in turn control the main valve, to in turn control flow through the valve in response to the signals from the first and second sensors;
a piping system comprising a supply line, a return line, and at least one load between the supply line and the return line;
wherein:
the first sensor is a temperature sensor operable to sense temperature of fluid in the supply line;
the second sensor is a temperature sensor operable to sense temperature of fluid in the return line;
the valve is disposed in the piping system, in the supply line or return line; and
the control system is programmed to control flow through the valve to maintain a predetermined temperature differential between the first and second sensor.

17. The HVAC system and flow control valve of claim 16, wherein the inlet aperture, closing element, diaphragm and operating chamber of the valve are aligned along the longitudinal axis of the disk.

18. The HVAC system and flow control valve of claim 17, wherein the longitudinal axis of the disk is a central longitudinal axis of the bore.

* * * * *